United States Patent [19]

Grinbergs et al.

[11] Patent Number: 4,745,133

[45] Date of Patent: May 17, 1988

[54] FLAME RETARDANT POLYURETHANE FOAMS

[75] Inventors: Egils Grinbergs, Farmington Hills; William W. Levis, Jr., Wyandotte; Steven D. Gagnon, Detroit, all of Mich.

[73] Assignee: BASF Corporation, Wyandotte, Mich.

[21] Appl. No.: 27,800

[22] Filed: Mar. 19, 1987

Related U.S. Application Data

[63] Continuation-in-part of Ser. No. 750,391, Jun. 28, 1985, abandoned.

[51] Int. Cl.$^4$ ............................................. C08G 18/14
[52] U.S. Cl. .................................... 521/128; 521/129; 521/137; 521/163; 521/166
[58] Field of Search ............... 521/128, 166, 137, 129, 521/163

[56] References Cited

U.S. PATENT DOCUMENTS

| | | | |
|---|---|---|---|
| 4,221,875 | 9/1980 | Yukuta et al. | 521/128 |
| 4,293,657 | 10/1981 | Nissen et al. | 521/166 |
| 4,317,889 | 3/1982 | Pcolinsky, Jr. | 521/166 |
| 4,427,797 | 1/1984 | Smith | 521/166 |
| 4,644,015 | 2/1987 | Scoccia et al. | 521/128 |

*Primary Examiner*—Morton Foelak
*Attorney, Agent, or Firm*—Norbert M. Lisicki

[57] ABSTRACT

The invention pertains to flame retardant polyurethane foams prepared by the reaction of a polyoxyalkylene polyether polyol with an organic polyisocyanate and a blowing agent wherein melamine is incorporated as the sole flame retardant compound. The amount of melamine may range from about 10 weight percent to about 55 weight percent of the total composition.

6 Claims, No Drawings

FLAME RETARDANT POLYURETHANE FOAMS

This is a continuation-in-part of application Ser. No. 750,391 filed June 28, 1985, now abandoned.

BACKGROUND OF THE INVENTION

1. Field on the Invention

The present invention pertains to flexible foam compositions and in particular to flexible polyurethane flame-retardant foam compositions and methods for the preparation thereof. More particularly, the present invention relates to the preparation of flexible polyurethane flame-retarded foam compositions which contain an effective amount of melamine as the sole flame retardant.

2. Description of the Prior Art

The preparation of flexible polyurethane flame-retardant foam compositions are generally well known as evidenced by the following prior art. U.S. Pat. No. 4,022,718 teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retardant, polyurethane foams by employing specific foam stabilizers which reduce the required amount of normal flame-retardant additives. U.S. Pat. No. 4,162,353 teaches the preparation of flexible polyurethane foams incorporating therein a halo-substituted alkyl phosphate such as, for example, tris(2-chlorethyl)-phosphate and an unsubstituted trialkylphosphate such as, for example triethylphosphate. U.S. Pat. No. 4,293,657 teaches the use of melamine polyol dispersions wherein the melamine particles are ground in situ with the polyol and wherein specific dispersion stabilizers are employed. U.S. Pat. No. 4,221,875 teaches the use of melamine in rigid polyurethane foam.

SUMMARY OF THE INVENTION

The present invention applies to high-resiliency, flexible polyurethane foam compositions, conventional flexible polyurethane foam compositions and high load bearing polyurethane foam compositions which are prepared by the reaction of a polyoxyalkylene polyether polyol compound having 2 to 4 active hydrogen atoms and an equivalent weight range from 750 to 3000 with an organic polyisocyanate in the presence of an effective amount of melamine and in the absence of a melamine dispersion stabilizer. The amount of melamine may range from about 10 weight percent to about 55 weight percent of the total composition and the melamine polyol dispersion is not crushed. Melamine is employed as the sole flame-retardant compound.

For a more complete understanding of the present invention, reference is made to the following detailed description and the examples thereof.

DESCRIPTION OF THE PREFERRED EMBODIMENTS

It has unexpectedly been found that, in the preparation of flexible flame-retarded polyurethane foam products, the amount of flame retardant compound necessary to impart flame retardency may range from about 10 weight percent to about 55 weight percent of the total composition. Lesser amounts will be insufficient to impart flame retardency while greater amounts will result in poor physical properties of the polyurethane foams.

Flexible foams are generally defined as having a high tensile to compressive strength ratio (25% deflection) from 15 to 60 or 70 to 1, high elongation, a fast recovery rate and a high elastic limit. Rigid foams on the other hand have a high ratio of compressive to tensile strength, 0.5 to 1 or greater low elongation (less than 10%) a low recovery rate from distortion and a low elastic limit.

Representative polyols which may be employed in the invention are well know to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 500 to 10,000, preferably from 750 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl) propane and blends thereof having equivalent weights of from 500 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two -SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The preferred polyether polyols are as follows:
(a) a glycerine or trimethylolpropane adduct containing ethylene oxide and propylene oxide containing about 5 to 25 weight percent ethylene oxide,
(b) a polyether blend containing the polyol of (a) above and a polyol containing from about 30 to about 60 weight percent of a 1:1 to 3:1 styrene:acrylonitrile graft polymer dispersion,
(c) a trimethylolpropane ethylene oxide propylene oxide adduct containing from about 30 to about 70 weight percent of from 1:1 to 3:1 styrene:acrylonitrile graft polymer dispersion. Furthermore, the amount of water preferred as the blowing agent ranges from about 2.0 weight percent to about 4.0 weight percent.

The polyurethane foams employed in the present invention are generally prepared by the reaction of a polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4', 4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine.

The polyoxyalkylene polyether polyols may be employed along with another polyhydroxyl-containing component commonly employed in the art. Any of the polyhydroxyl-containing components which are described above for use in the preparation of the polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane foam were determined by the following ASTM tests:

Density - D1622-63
Tensile Strength - D1623-72
Elongation - D412
Split Tear - D470
Compression Set - D395
Compression Load - D1564
Humid Aging - D1564

Additional tests included the California Bulletin No. 117 Test MVSS 302

The following abbreviations are employed in the examples below:

Polyol A is a propylene oxide/ethylene oxide adduct of glycerine having a hydroxyl number of 35 and containing 16.5 percent ethylene oxide.

Polyol B is a propylene oxide adduct of propylene glycol containing 50 percent of 2:1 styrene:acrylonitrile graft dispersion having a hydroxyl number of about 69.7.

Polyol C is a propylene oxide/ethylene oxide adduct of a mixture of glycerine and propylene glycol having a hydroxyl number of 56 and containing 9.0 percent ethylene oxide.

Polyol D is a propylene oxide ethylene oxide adduct of trimethylolpropane containing 31 percent of a 3:1 styrene: acrylonitrile graft dispersion having a hydroxyl number of 24.0.

Polyol E is a propylene oxide adduct of a mixture of glycerine and propylene glycol having a hydroxyl number of 57.6.

Polyol F is a propylene oxide/ethylene oxide adduct of trimethylolpropane having a hydroxyl number of 25 and containing 15 percent ethylene oxide.

Polyol G is a propylene oxide adduct of propylene glycol having a hydroxyl number of 29 and containing 18 percent ethylene oxide.

Polyol H is a propylene oxide adduct of dipropylene glycol having a hydroxyl number of 29 and containing 18 percent ethylene oxide.

DEOA is diethanolamine.

Silicone 5043 is a silicone surfactant manufactured by Dow Corning Corporation.

T-12 is dibutyltin dilaurate.

T-10 is stannous octoate in dioctylphthalate.

Freon 11 is monoflurotrichloromethane.

Dabco 33LV is a 33 percent solution of triethylene diamine in dipropylene glycol.

Silicon B3640 is a silicone surfactant manufactured by Goldschmidt Corporation.

Niax A-4 is an amine catalyst manufactured by Union Carbide Corporation.

Niax A-1 is an amine catalyst manufactured by Union Carbide Corporation.

TDI is toluene diisocyanate.

DE60F is pentabromodiphenyl oxide.

EXAMPLES 1-41

Examples 1-41 were prepared by employing the following procedure:

Blend A, composed of the polyol, Freon 11, catalyst T-12 or 10, DEOA, and melamine in the proportions listed, was charged into a 150-gallon tank equipped with a turbine blade agitator turning at 100 rpm and agitated for about three hours at 72° F. Blend B, composed of water, Dabco 33LV, NIAX A-1 and additional DEOA was charged into another tank. Silicone surfactant was charged into a third tank and the TDI was charged into a fourth tank. These components were metered into a Hennecke UBT foam machine running with a mixer speed of 5000 rpm in the ratios of 82:1.5:0.5:13.6. The mixture was discharged from the mixing head unto a conveyor. The foam expanded to its full height in about three minutes. After a sufficient cure time the foams were submitted for physical property determinations.

TABLE I

| | Example | | | | | |
|---|---|---|---|---|---|---|
| | 1 | 2 | 3 | 4 | 5 | 6 |
| Formulation | | | | | | |
| Polyol A | 100 | 100 | 100 | 100 | 100 | 100 |
| Melamine | 0 | 5 | 10 | 15 | 20 | 25 |
| Silicone B3640 | 1.0 | 1.0 | 1.0 | 1.0 | 1.0 | 1.0 |
| $H_2O$ | 4.0 | 4.0 | 4.0 | 4.0 | 4.0 | 4.0 |
| Dabco 33LV | 0.2 | 0.2 | 0.2 | 0.2 | 0.2 | 0.2 |
| T-10 | 0.3 | 0.3 | 0.3 | 0.3 | 0.3 | 0.3 |
| TDI (110 Index) | 52.3 | 52.3 | 52.3 | 52.3 | 52.3 | 52.3 |
| Foam Properties | | | | | | |
| Density, PCF | 1.71 | 1.79 | 1.83 | 1.88 | 1.94 | 2.07 |
| Tensile, PSI | 15.6 | 13.4 | 12.4 | 11.7 | 12.1 | 12.3 |
| Tear, PI | 2.4 | 2.4 | 2.2 | 2.0 | 1.9 | 2.1 |
| Elongation, % | 176.7 | 163.3 | 140.0 | 126.7 | 123.3 | 120.0 |
| Resilience, % | 44.0 | 46.0 | 42.0 | 41.0 | 41.0 | 39.0 |
| Air Flow, (CFM) | 7.20 | 7.30 | 6.90 | 7.10 | 6.80 | 6.40 |
| CLD, PSI, 50% | 0.57 | 0.55 | 0.61 | 0.62 | 0.64 | 0.69 |
| Cal. 117 Flame Test | | | | | | |
| After Flame, sec. | | | | | | |
| Avg. | 39.8 | 23.4 | 25.9 | 32.0 | 1.4 | 4.2 |
| Max. | 50.0 | 32.0 | 29.0 | 43.0 | 0.0 | 6.0 |
| Char Length, in. | | | | | | |
| Avg. | 12.0 | 12.0 | 12.0 | 12.0 | 1.0 | 0.4 |
| Max. | 12.0 | 12.0 | 12.0 | 12.0 | 1.5 | 0.9 |
| MVSS-302 | | | | | | |
| Distance burned | 10.0 | 10.0 | 10.0 | 10.0 | 5.7 | 0.0 |
| Burn rate | 4.0 | 4.4 | 4.4 | 4.1 | 3.9 | 0.0 |

TABLE II

| | Example | | | | | | | | |
|---|---|---|---|---|---|---|---|---|---|
| | 7 | 8 | 9 | 10 | 11 | 12 | 13 | 14 | 15 |
| Formulation | | | | | | | | | |
| Polyol A | 50 | → | → | → | → | → | → | → | → |
| Polyol B | 50 | → | → | → | → | → | → | → | → |
| Melamine | 0 | 5 | 10 | 15 | 20 | 25 | 30 | 40 | 50 |
| Silicone B3640 | 1.0 | → | → | → | → | → | → | → | → |
| $H_2O$ | 4.0 | → | → | → | → | → | → | → | → |
| Dabco 33LV | 0.3 | → | → | → | → | → | → | → | → |
| T-10 | 0.3 | → | → | → | → | → | → | → | → |
| TDI (110 Index) | 50.0 | → | → | → | → | → | → | → | → |
| Foam Properties | | | | | | | | | |
| Density, PCF | 1.66 | 1.77 | 1.77 | 1.88 | 1.99 | 2.04 | 1.99 | 2.06 | 2.18 |
| Tensile, PSI | 20.9 | 17.6 | 15.9 | 16.6 | 16.5 | 16.8 | 13.8 | 13.4 | 13.2 |
| Tear, PI | 2.9 | 2.2 | 2.1 | 2.0 | 2.0 | 1.9 | 2.0 | 2.0 | 1.9 |
| Elongation, % | 146.7 | 106.7 | 103.3 | 93.3 | 96.7 | 93.3 | 76.6 | 86.7 | 86.7 |
| Resilience, % | 34.0 | 30.0 | 32.0 | 32.0 | 31.0 | 33.0 | 34.0 | 32.0 | 32.0 |
| Air Flow, (CFM) | 7.80 | 7.00 | 7.30 | 7.30 | 6.25 | 6.20 | 5.40 | 5.30 | 4.80 |
| CLD, PSI, 50% | 0.83 | 0.95 | 0.87 | 0.97 | 0.98 | 0.96 | 1.03 | 0.94 | 0.96 |
| Cal. 117 Flame Test | | | | | | | | | |
| After Flame, sec. | | | | | | | | | |
| Avg. | 66.4 | 64.4 | 73.8 | 62.6 | 22.4 | 11.0 | 19.4 | 2.0 | 1.0 |
| Max. | 71.0 | 68.0 | 76.0 | 79.0 | 30.0 | 16.2 | 61.0 | 2.0 | 2.0 |
| Char Length, in. | | | | | | | | | |
| Avg. | 12.0 | 12.0 | 12.0 | 12.0 | 11.4 | 11.4 | 6.3 | 2.9 | 1.9 |
| Max. | 12.0 | 12.0 | 12.0 | 12.0 | 12.0 | 12.0 | 12.0 | 5.4 | 2.8 |
| MVSS-302 | | | | | | | | | |
| Distance burned | 10.0 | 10.0 | 10.0 | 10.0 | 10.0 | 5.4 | 5.8 | 1.0 | 0.0 |
| Burn rate | 4.2 | 4.2 | 4.3 | 3.9 | 3.7 | 3.5 | 3.5 | 4.3 | 0.0 |

TABLE III

| | Example | | | | | |
|---|---|---|---|---|---|---|
| | 16 | 17 | 18 | 19 | 20 | 21 |
| Formulation | | | | | | |
| Polyol C | 65 | → | → | → | → | → |
| Polyol D | 35 | → | → | → | → | → |
| Melamine | 0 | 5 | 10 | 15 | 20 | 25 |
| Silicone L-5309 | 1.0 | → | → | → | → | → |
| $H_2O$ | 2.0 | → | → | → | → | → |
| DEOA | 0.8 | → | → | → | → | → |
| Dabco 33LV | 0.18 | → | → | → | → | → |
| NIAX A-1 | 0.06 | → | → | → | → | → |
| T-12 | 0.05 | → | → | → | → | → |
| TDI (105 Index) | 27.7 | → | → | → | → | → |
| Foam Properties | | | | | | |
| Density, PCF | 3.27 | 3.28 | 3.33 | 3.48 | 3.62 | 3.76 |
| Tensile, PSI | 20.8 | 18.7 | 18.9 | 18.2 | 16.6 | 16.6 |
| Tear, PI | 2.2 | 2.7 | 2.3 | 2.3 | 2.2 | 2.1 |
| Elongation, % | 170.0 | 150.0 | 153.3 | 140.0 | 130.0 | 130.0 |
| Resilience, % | 47.0 | 50.0 | 49.0 | 50.0 | 49.0 | 50.0 |
| Air Flow, (CFM) | 0.33 | 0.28 | 0.26 | 0.27 | 0.24 | 0.32 |
| CLD, PSI, 50% | 0.75 | 0.74 | 0.76 | 0.80 | 0.86 | 0.90 |
| Cal. 117 Flame Test | | | | | | |
| After Flame, sec. | | | | | | |
| Avg. | 29.8 | 1.0 | 13.2 | 1.0 | 1.0 | 1.0 |
| Max. | 33.0 | 2.0 | 28.0 | 1.0 | 1.0 | 1.0 |
| Char Length, in. | | | | | | |
| Avg. | 12.0 | 2.0 | 2.7 | 1.5 | 1.5 | 1.2 |
| Max. | 12.0 | 2.3 | 3.9 | 1.8 | 1.7 | 1.4 |
| MVSS-302 | | | | | | |
| Distance Burned | 0.0 | → | → | → | → | → |
| Burn Rate in/min | 0.0 | → | → | → | → | → |

TABLE IV

| | Example | | | | | | | | |
|---|---|---|---|---|---|---|---|---|---|
| | 22 | 23 | 24 | 25 | 26 | 27 | 28 | 29 | 30 |
| Formulation | | | | | | | | | |
| Polyol C | 65.0 | → | → | → | → | → | → | → | → |
| Polyol D | 35.0 | → | → | → | → | → | → | → | → |
| Melamine | 0 | 5 | 10 | 15 | 20 | 25 | 30 | 40 | 50 |
| Silicone L-5309 | 1.2 | → | → | → | → | → | → | → | → |
| $H_2O$ | 4.0 | → | → | → | → | → | → | → | → |
| Dabco 33LV | 0.18 | → | → | → | → | → | → | → | → |

TABLE IV-continued

|  | Example | | | | | | | | |
|---|---|---|---|---|---|---|---|---|---|
|  | 22 | 23 | 24 | 25 | 26 | 27 | 28 | 29 | 30 |
| T-12 | 0.1 | → | → | → | → | → | → | → | → |
| NIAX A-1 | 0.06 | → | → | → | → | → | → | → | → |
| TDI (105 Index) | 49.03 | → | → | → | → | → | → | → | → |
| Foam Properties | | | | | | | | | |
| Density, PCF | 1.48 | 1.56 | 1.62 | 1.67 | 1.72 | 1.78 | 1.88 | 1.91 | 2.09 |
| Tensile, PSI | 17.0 | 16.6 | 13.7 | 14.6 | 14.8 | 14.3 | 13.9 | 8.9 | 5.9 |
| Tear, PI | 2.8 | 2.8 | 2.4 | 2.4 | 2.3 | 2.3 | 2.1 | 1.7 | 1.6 |
| Elongation, % | 170.0 | 160.0 | 130.0 | 140.0 | 136.7 | 143.3 | 126.7 | 83.3 | 66.7 |
| Resilience, % | 42.0 | 42.0 | 42.0 | 43.0 | 39.0 | 39.0 | 38.0 | 39.0 | 35.0 |
| Air Flow, (CFM) | 0.18 | 0.18 | 0.16 | 0.17 | 0.18 | 0.17 | 0.20 | 0.28 | 0.42 |
| CLD, PSI, 50% | 0.44 | 0.45 | 0.47 | 0.50 | 0.52 | 0.52 | 0.58 | 0.75 | 0.93 |
| Cal. 117 Flame Test | | | | | | | | | |
| After Flame, sec. | | | | | | | | | |
| Avg. | 25.0 | 9.6 | 19.4 | 20.0 | 15.2 | 7.6 | 2.4 | 1.2 | 1.6 |
| Max. | 28.0 | 25.0 | 29.0 | 22.0 | 20.0 | 12.0 | 1.0 | 6.0 | 9.0 |
| Char Length, in. | | | | | | | | | |
| Avg. | 12.0 | 12.0 | 12.0 | 12.0 | 10.8 | 5.7 | 1.5 | 2.6 | 2.7 |
| Max. | 12.0 | 12.0 | 12.0 | 12.0 | 12.0 | 6.8 | 2.0 | 4.0 | 5.6 |
| MVSS-302 | | | | | | | | | |
| Distance burned | 10.8 | 1.8 | 0.0 | → | → | → | → | → | → |
| Burn rate, in./min. | 4.8 | 5.1 | 0.0 | → | → | → | → | → | → |

TABLE V

|  | Example | | | | |
|---|---|---|---|---|---|
|  | 31 | 32 | 33 | 34 | 35 |
| Formulation | | | | | |
| Polyol B | 100.0 | → | → | → | → |
| Melamine | 0 | 30 | 40 | 50 | 60 |
| Silicone B3640 | 1.0 | → | → | → | → |
| H₂O | 4.0 | → | → | → | → |
| Freon 11 | 5.0 | → | → | → | → |
| Dabco 33LV | 0.2 | → | → | → | → |
| T-10 | 0.2 | → | → | → | → |
| TDI (110 Index) | 47.7 | → | → | → | → |
| Foam Properties | | | | | |
| Density, PCF | 1.44 | 1.76 | 1.81 | 2.03 | 2.18 |
| Tensile, PSI | 17.4 | 14.8 | 13.0 | 12.3 | 11.3 |
| Tear, PI | 1.8 | 1.4 | 1.1 | 1.2 | 0.9 |
| Elongation, % | 73.3 | 60.0 | 53.3 | 56.7 | 46.7 |
| Resilience, % | 28.0 | 28.0 | 28.0 | 26.0 | 29.0 |
| Air Flow, (CFM) | 6.50 | 3.90 | 3.50 | 3.00 | 3.20 |
| CLD, PSI, 50% | 1.12 | 1.20 | 1.14 | 1.35 | 1.46 |
| Cal. 117 Flame Test | | | | | |
| After Flame, sec. | | | | | |
| Avg. | 30.0 | 15.8 | 16.8 | 1.6 | 1.4 |
| Max. | 38.0 | 23.0 | 24.0 | 8.0 | 5.0 |
| Char Length, in. | | | | | |
| Avg. | 12.0 | 10.7 | 8.6 | 3.2 | 2.8 |
| Max. | 12.0 | 12.0 | 10.0 | 5.8 | 3.6 |
| MVSS-302 | | | | | |
| Distance burned | 10.0 | 10.0 | 10.0 | 7.5 | 2.1 |
| Burn rate, in./min. | 4.9 | 3.4 | 3.4 | 2.9 | 2.7 |

TABLE VI

|  | Example | | | | | |
|---|---|---|---|---|---|---|
|  | 36 | 37 | 38 | 39 | 40 | 41 |
| Formulation | | | | | | |
| Polyol E | 50 | → | → | → | → | → |
| Polyol F | 50 | → | → | → | → | → |
| H₂O | 2.0 | → | → | → | → | → |
| Dabco 33LV | .272 | → | → | → | → | → |
| NIAX A-4 | .2 | → | → | → | → | → |
| NIAX A-1 | .1 | → | → | → | → | → |
| DEOA | 1.0 | → | → | → | → | → |
| L-5309 | 1.45 | → | → | → | → | → |
| TDI (100 Index) | 26.7 | → | → | → | → | → |
| Melamine | 35 | 40 | 45 | — | — | — |
| DE 60F | — | — | — | 35 | 40 | 45 |
| Foam Properties | | | | | | |
| Density, PCF | 4.69 | 4.80 | 5.13 | 4.98 | 5.15 | |
| ILD (lbs./50 sq. in.) | | | | | | |
| 25% | 78.5 | 74.5 | 73.0 | 61.5 | 53.5 | 57.5 |
| 65% | 228.0 | 218.5 | 206.0 | 158.0 | 142.5 | 148.0 |
| 25% R | 66.0 | 62.0 | 60.0 | 53.0 | 47.0 | 50.0 |
| Sag | 2.90 | 2.93 | 2.82 | 2.57 | 2.66 | 2.57 |
| % Recovery | 84.08 | 83.22 | 82.19 | 86.18 | 87.85 | 86.96 |
| Tensile (psi) | 18.8 | 17.9 | 17.0 | 21.5 | 19.4 | 22.0 |
| Tensile (heat aged) | 22.1 | 19.1 | 17.9 | 24.7 | 20.3 | 24.1 |
| Elongation, % | 107 | 108 | 98 | 138 | 143 | 143 |
| Tear (ppi) | 1.7 | 1.6 | 1.7 | 1.7 | 1.8 | 1.9 |
| Humid Aged Sets | | | | | | |
| (3 hr. at 220° F.) | | | | | | |
| 50% | 10.40 | 11.60 | 10.86 | 8.10 | 8.41 | 6.76 |
| 75% 8.71 | 8.25 | 8.59 | 6.30 | 5.56 | 5.38 | |
| CLD 50% (psi) | 1.47 | 1.46 | 1.45 | 1.24 | 1.03 | 1.06 |

TABLE VI-continued

|  | Example | | | | | |
| --- | --- | --- | --- | --- | --- | --- |
|  | 36 | 37 | 38 | 39 | 40 | 41 |
| CLD (humid aged) 50% | 1.26 | .92 | 1.24 | 1.07 | .89 | .95 |
| CLD % of original | 85.71 | 63.01 | 85.52 | 86.29 | 86.80 | 89.25 |
| Compression Sets | | | | | | |
| 50% | 10.40 | 10.50 | 8.73 | 7.22 | 6.53 | 6.76 |
| 75% | 10.20 | 9.87 | 10.37 | 5.77 | 7.07 | 6.45 |
| Air Flow (cfm) | .27 | .24 | .28 | .65 | .70 | 1.00 |
| Cal. 117 Vert. Original | | | | | | |
| (maximum/avg.)-Afterflame | 2.0/.6 | 2.0/.6 | 3.0/1.2 | 32.0/20.2 | 15.0/8.0 | 76.0/48.8 |
| (maximum/avg.)-Char Length | 1.8/1.5 | 1.1/1.0 | 1.7/1.4 | 4.1/2.7 | 3.4/2.0 | 8.3/6.2 |
| Heat Aged | | | | | | |
| (max) | 13.0/11.2 | 11.0/6.8 | 4.0/2.0 | 7.0/5.0 | 42.0/21.8 | 91.0/69.0 |
| (max) | 4.1/2.3 | 1.5/1.4 | 1.3/1.1 | 1.6/1.4 | 6.0/3.5 | 12.0/9.5 |
| Cal. No. 117 Smold. % Residue | 98.8 | 98.8 | 99.0 | 96.8 | 97.2 | 96.8 |

TABLE VII

| Example | 42 |
| --- | --- |
| Formulation | |
| Polyol B | 8.0 |
| Polyol A | 87.0 |
| Fyrol CEF | 5.0 |
| Melamine | 225 |
| DEOA | 1.2 |
| Silicone 5043 | 1.4 |
| T-12 | 0.1 |
| Methylene chloride | 5 |
| Water | 2.4 |
| Dabco 33LV | 0.18 |
| NIAX A-1 | 0.06 |
| TDI (112 Index) | 35.58 |
| Foam Properties | |
| Density, PCF | Foam collapsed |
| Tensile Strength, psi | |
| Elongation, % | |
| Tear, pi | |

Example 42 illustrates that employing about 60 weight percent melamine causes the foam to collapse. The preceding tables illustrate that a minimum quantity of melamine (about 10 percent) is required to obtain a flame-retardant foam. The tables further illustrate that concentrations of melamine exceeding 55 weight percent will cause the foam to collapse.

The embodiments of the invention in which an exclusive privilege or property is derived are defined as follows:

1. The preparation of a flame-retardant flexible polyurethane foam consisting of reacting a polyoxyalkylene polyether polyol having an average equivalent weight of from about 500 to about 3000, an organic polyisocyanate, a blowing agent, and a silicone surfactant wherein dispersed in the polyether polyol is melamine in the amount ranging from about 10 weight percent to about 55 weight percent of the total composition as the sole flame-retardant compound in the absence of a melamine dispersion stabilizer and wherein the melamine polyol dispersion is not crushed.

2. The foam of claim 1 wherein the polyether polyol is a glycerine or trimethylolpropane adduct containing ethylene oxide and propylene oxide said polyol containing from about 5 to about 25 weight percent ethylene oxide.

3. The foam of claim 1 wherein the polyether polyol is a blend of the polyol of claim 2 and a polyol containing from about 30 to about 60 weight percent of a 1:1 to 3:1 styrene to acrylonitrile graft polymer dispersion.

4. The foam of claim 3 wherein the amount of water as the blowing agent is less than about 2.5 weight percent of the total composition.

5. The foam of claim 3 wherein the amount of water as the blowing agent is less than 4.5 weight percent of the total composition.

6. The foam of claim 5 wherein the polyether polyol is an alkylene oxide adduct of trimethylolpropane containing at least 30 weight percent of from about 1:1 to about 3:1 styrene:acrylonitrile graft polymer dispersion.

* * * * *